(12) United States Patent
Stenner et al.

(10) Patent No.: US 12,030,728 B2
(45) Date of Patent: Jul. 9, 2024

(54) DEVICE AND METHOD FOR CONVEYING CONTAINERS

(71) Applicant: KHS GMBH, Dortmund (DE)

(72) Inventors: Holger Stenner, Haltern am See (DE); Andreas Fahldieck, Idar-Oberstein (DE)

(73) Assignee: KHS GmbH, Dortmund (DE)

( * ) Notice: Subject to any disclaimer, the term of this patent is extended or adjusted under 35 U.S.C. 154(b) by 121 days.

(21) Appl. No.: 17/795,000

(22) PCT Filed: Feb. 8, 2021

(86) PCT No.: PCT/EP2021/052916
§ 371 (c)(1),
(2) Date: Jul. 25, 2022

(87) PCT Pub. No.: WO2021/165074
PCT Pub. Date: Aug. 26, 2021

(65) Prior Publication Data
US 2023/0063999 A1 Mar. 2, 2023

(30) Foreign Application Priority Data
Feb. 17, 2020 (DE) .................... 10 2020 104 091.1

(51) Int. Cl.
*B65G 47/28* (2006.01)
*B65G 21/10* (2006.01)
*B65G 21/22* (2006.01)

(52) U.S. Cl.
CPC ...... *B65G 47/28* (2013.01); *B65G 2201/0235* (2013.01)

(58) Field of Classification Search
None
See application file for complete search history.

(56) References Cited

U.S. PATENT DOCUMENTS 2,951,574 A   9/1960 Craig
3,767,027 A * 10/1973 Pund .................... B65G 47/681
                                                                198/452

(Continued)

FOREIGN PATENT DOCUMENTS

| DE | 10146447 C1 | 4/2003 |
| EP | 3063081 B1 | 11/2017 |
| WO | 2010142918 A1 | 12/2010 |

*Primary Examiner* — Kavel Singh
(74) *Attorney, Agent, or Firm* — Laurence A. Greenberg; Werner H. Stemer; Ralph E. Locher

(57) ABSTRACT

A container guiding device has a railing with two guide elements that are spaced from one another, that extend in the transport direction of a container transport device, and that guide containers or packages. At least one guide element can be adjusted transversely to the transport direction relative to the other guide element by an adjusting device. The adjusting device has a drive body which can be rotated about a rotational axis and a coupling element which is connected to the at least one guide element and to the drive body such that a rotation of the drive body produces a translation of the coupling element transversely to the transport direction. The drive body has a control element which is in engagement with the coupling element and which runs in a spiral shape about the rotational axis of the drive body, at least along some sections.

17 Claims, 11 Drawing Sheets

(56) References Cited

U.S. PATENT DOCUMENTS

| | | | | |
|---|---|---|---|---|
| 5,211,280 | A * | 5/1993 | Houde | B65G 21/2072 |
| | | | | 198/836.3 |
| 7,392,894 | B2 * | 7/2008 | Jacob | B65B 21/04 |
| | | | | 198/453 |
| 8,613,355 | B2 * | 12/2013 | Andreoli | B65G 21/2072 |
| | | | | 198/837 |
| 8,770,392 | B2 * | 7/2014 | Berger | B65G 21/2072 |
| | | | | 198/813 |
| 9,828,186 | B2 * | 11/2017 | Weickert | B65G 21/2072 |
| 2017/0066596 | A1 | 3/2017 | Weickert et al. | |

* cited by examiner

DEVICE AND METHOD FOR CONVEYING CONTAINERS

FIELD AND BACKGROUND OF THE INVENTION

The invention relates to a container guiding device with a railing with two guide elements which are mutually spaced apart and which extend in the transport direction of a container transport device for guiding containers or packages, wherein at least one guide element can be adjusted transversely to the transport direction relative to the other guide element by means of an adjusting device, which adjusting device comprises a drive body which can be rotated about a rotational axis, and a coupling element which is connected to the at least one guide element and is connected to the drive body in such a way that a rotation of the drive body produces an adjustment of the coupling element transversely to the transport direction.

In container handling systems, such as filling systems for filling a liquid medium into containers such as bottles, cans, or the like, the containers are often transported over long transport paths by means of a transport device with a container guiding device. The individual containers, and/or containers assembled to produce packages, are in this situation guided through the container handling system with the aid of a railing of the container handling device. In this situation, the railing comprises railing elements provided on both sides on the container transport device, the distance between which can be adjusted as a dependency of the width of the containers or packages which are to be guided through between the railing elements, and/or of the number of the containers which are to be guided simultaneously between the railing elements.

Known container guiding devices, such as, for example, the container guiding device known from EP 3 063 081 B1, comprise for this purpose complicated configured adjustment mechanisms, which require a large amount of space in order to provide the degree of adjustment required. As well as that, the known adjusting devices are very expensive and elaborate with regard to maintenance and installation, and also require means for securing the railing positions which have been set in order to avoid an unwanted change in the spacing interval between the guide elements during operation as a consequence of an interaction with the containers or packages.

SUMMARY OF THE INVENTION

The invention is based on the object of providing a container guiding device of the type referred to heretofore, which can be economically manufactured and exhibits a simple and compact structure.

The invention solves the object by a container guiding device with the features as claimed. Advantageous further embodiments of the container guiding device according to the invention are described in the dependent claims 2 to 13.

The invention further relates to a container transport device with at least one container guiding device according to the invention, as claimed, and to a method for adjusting the spacing interval between the guide elements of a railing, making use of a container guiding device according to the invention, as claimed.

Characteristic of the container guiding device according to the invention is that the drive body comprises a control element, which is in engagement with the coupling element, which in turn is connected to the guide element, and which at least in sections exhibits a spiral course of movement about the rotational axis of the drive body. Ideally, the drive body is formed from two disk-shaped halves, between which the coupling element is received, such that its guide bolts are mounted and guided in the foresaid control elements in a displaceable manner.

With the container guiding device according to the invention, an adjustment of the coupling element in relation to the adjusting device causes a displacement of the guide element connected to the coupling element. A displacement of the coupling element then results from a rotation of the drive body connected to the coupling element, for which purpose this drive body comprises a control element, which exhibits a spiral course of movement extending at least in sections about the rotational axis. That is to say, the control element extends along a curve which runs around the rotational axis, and which, depending on the perspective of the observer, moves away from the rotational axis or approaches it. The curve along which the spiral course of movement of the control element extends, advantageously extends in a plane perpendicular to the rotational axis. Preferably, the control element describes a curve about the rotational axis with a course of movement in the form of an Archimedean spiral, wherein the radius of the curve to the rotational axis changes continuously as a function of the angle of rotation of the drive body, in particular proportionally to the angle of rotation, i.e. increases or decreases.

The connection according to the invention of the control element to the coupling element therefore has the result on the one hand that, on a rotation of the drive body, the coupling element retains its position in the circumferential direction of the drive body. On the other hand, a rotation of the drive body results in a displacement of the coupling element, directed in the axial direction of the coupling element, corresponding to the spiral course of movement of the control element. Accordingly, as a dependency of the rotational direction of the drive body, the coupling element is displaced in the direction onto the rotational axis or in the opposite direction, as a result of which a guide element connected to the coupling element can be adjusted in a linear manner in relation to the adjusting device arranged in a fixed position on a container transport device. By a corresponding arrangement of the adjusting device, taking account of the transport direction of the container transport device, this therefore allows for at least one guide element of the railing, comprising two guide elements, to be adjusted transversely to the transport direction, such that the width of the railing can be adjusted by means of the adjusting device according to the invention.

In the meaning of the invention, the expression "railing width" (in specialist circles in part also designated as the conveying width) is to be understood as the spacing interval between mutually opposed railing elements.

The configuration according to the invention of the drive body, with a control element extending in spiral fashion about the rotational axis, therefore allows for a particularly simple and compact structure of the adjusting device, wherein, by means of the configuration of the spiral course of the drive body, which is basically freely selectable, the linear adjustment capacity can be determined as desired, as a dependency of the rotation of the drive body. The adjusting device of the container guiding device according to the invention can in this situation be configured as particularly compact and simple, and also allows for separate elements to be done without, otherwise required for securing the position of the guide elements which has been set, since the coupling element essentially takes effect perpendicularly onto the spiral-shaped control element, and therefore a self-inhibiting effect is imposed on the position which has been set.

The configuration of the control element and its connection to the coupling element, in such a way that a rotation of the drive body causes a displacement of the guide element connected to the coupling element transversely to the transport direction of the container transport device, is in principle freely selectable. According to a particularly advantageous configuration of the invention, however, provision is made for the control element to be configured as a control groove, which is provided for the displaceable receiving of a control bolt, connected to the coupling element and preferably aligned parallel to the rotational axis.

According to this embodiment of the invention, the drive body comprises a control groove inserted into the upper side, which extends in a spiral shape about the rotational axis. In order to connect the coupling element to the drive body in such a way that a rotation of the drive body causes a displacement of the guide element connected to the coupling element, the coupling element comprises a control bolt, which is displaceably arranged inside the control groove. Due to the spiral shaped course of the control groove, a rotation of the control body over the control bolt arranged in the control groove therefore causes a displacement of the coupling element, wherein its direction of movement is dependent on the rotational direction of the drive body, and therefore a rotation of the spiral shaped control groove about the rotational axis.

The use of a control groove as a control element is characterised in this situation by the fact that it can be formed particularly easily and economically at the drive body. In addition, the control groove allows for a particularly simple and uncomplicated coupling of the coupling element to the control groove by means of a control bolt arranged in the control groove, which can be arranged in both a jointed manner as well as torsionally resistant at the coupling element. The container guiding device can therefore be manufactured particularly simply and economically, and exhibits high reliability.

The configuration of the guidance of the coupling element during this adjustment, like the arrangement of the drive body inside the adjusting device, is in principle freely selectable. According to a particularly advantageous embodiment of the invention, however, provision is made for the drive body to be arranged such as to rotate in a housing of the adjusting device, wherein the housing exhibits a guide opening which secures the coupling element in the circumferential direction of the drive body.

According to this further embodiment of the invention, the housing serves to receive the drive body in a rotatable manner, such that this is protected against external influences, as a result of which a high degree of operational reliability of the container guiding device is ensured. The housing further comprises a guide opening, mounted inside which is the coupling element, displaceable axially. The guide opening therefore secures the coupling element in the circumferential direction of the drive body, and causes a conversion of the direction of rotation of the drive body into a linear movement of the coupling element inside the guide opening, wherein the movement direction of the coupling element is dependent on the direction of rotation of the drive body.

This embodiment of the invention is characterised by a particularly compact structure, and a particularly simple conversion of the rotational movement of the drive body into a linear movement of the coupling element, which in a corresponding manner is transferred onto the guide element connected to the coupling element. The movement direction of the guide element of the container guiding device in relation to the container transport device can therefore be determined particularly simply and reliably.

The function of the container guiding device is basically already ensured by the use of a drive body, which is located above the control element in engagement with the coupling element. According to a particularly advantageous embodiment of the invention, however, provision is made for the adjusting device to comprise two drive bodies with corresponding control grooves, opposite one another in the direction of the rotational axis, which in each case are configured such as to receive opposing sections, projecting over the coupling element, of the control bolt connected to the coupling element.

According to this embodiment of the invention, the adjusting device comprises two drive bodies with congruent control grooves, such that, by means of a control bolt extending into both control grooves, the coupling element is mounted in an adjustable manner on both drive bodies. This embodiment of the invention ensures, in a particularly reliable manner, the initiation of a displacement, corresponding to the adjustment of the drive bodies, of the guide element connected to the coupling element. Problems due to the detachment of the connection between the control bolt and the control groove can be prevented particularly reliably.

An adjustment of the drive body, namely its rotation about its rotational axis, can in principle be caused in any desired manner, for example by suitable drive elements or chain drives. According to one particularly advantageous embodiment of the invention, however, provision is made for the drive body to be connected in a torsionally resistant manner to a drive shaft, projecting in direction of the rotational axis. According to this embodiment of the invention, the drive shaft extends, in the direction of the rotational axis, through the drive body, such that a rotation of the drive shaft results in a rotation of the drive body about its rotational axis. Depending on the direction of rotation of the drive shaft, the spacing interval between the guide elements can therefore be adjusted in a particularly simple and convenient manner.

According to a further embodiment of the invention, provision is further made for the coupling element to be configured in such a way, in particular being curved in the region of the drive body, that, related to the rotational axis, it is in engagement with the drive body on the side facing away from the guide element.

According to this embodiment of the invention, the guide element does not exhibit a straight-line shape, but is curved in sections, such as U-shaped, such that it can be guided around the rotational axis, as a result of which there is the possibility of the guide element being brought into engagement with the drive body on the side of the rotational axis facing away from the guide element, for example of coupling to the control groove by means of a control bolt. This embodiment allows for a particularly stable adjustment and securing of the position of the guide elements which has been set in relation to the adjusting device.

According to a further embodiment of the invention, provision is further made for the adjusting device to comprise two coupling elements, located in engagement with the drive body in such a way that an adjustment of the drive body causes a counter-directional adjustment of the coupling elements. According to this embodiment of the invention, a single adjusting device with at least one drive body serves to adjust two coupling elements connected to the drive body. With an opposing arrangement, i.e. diametrically opposite, of the control bolt in the control groove, related to the rotational axis, a rotation of the drive body therefore results in an opposed adjustment of the coupling elements, i.e. as a dependency of the rotational direction of the drive body, the guide elements connected to the coupling elements are moved towards one another or away from one another.

This embodiment of the invention therefore allows, by making use of one single adjusting device, for two coupling elements, and therefore two guide elements connected to the coupling elements, to be adjusted in relation to a container transport device arranged with the container guiding device, wherein the two coupling elements, seen in the rotational axis direction of the drive body, are preferably arranged on mutually opposing sides, and are connected by control bolts, extending in opposed directions, to the control groove, in each case going outwards from the coupling element.

The transfer of the adjustment movements of the coupling elements onto the guide elements can in principle take place in any desired manner. According to a particularly advantageous embodiment of the invention, however, provision is made for the preferably two coupling elements, located in engagement with only one drive body, to be each connected to links, which in turn are each connected to guide elements arranged opposite one another. According to this embodiment of the invention, the links are connected to the coupling elements as well as to the guide elements. The configuration of the links therefore allows for a convenient arrangement of the adjusting devices in relation to the railings of the container transport device. This then allows, for example, for the links to be configured in such a way that the adjusting devices can be arranged beneath a transport plane, in a space-saving manner. In particular, the use of the links therefore allows for a simple connection of the guide elements to only one adjusting device, for the displacement of both the guide elements.

The arrangement of the container guiding device on a container transport device can in principle be effected in any desired manner. According to one particularly advantageous embodiment, however, provision is made for the housing of an adjusting device to comprise a holding element for securing the adjusting device to the container transport device. This embodiment of the invention allows for the particularly simple and uncomplicated mounting of the container guiding device to a container transport device. The container guiding device according to this further embodiment of the invention can therefore also be arranged as a retrofitting on existing container transport devices in a simple and uncomplicated manner, wherein, for this purpose, the holding element can be provided with corresponding holding sections.

For the adjustment of the railing width, determined by the spacing interval between the guide elements, it is sufficient to use an adjusting device to adjust one of the two guide elements of the railing in relation to the fixed-position guide element. According to one particularly advantageous embodiment of the invention, however, provision is made for both guide elements of the railing to be displaceable in each case by means of an adjusting device, transversely to the transport direction, wherein the adjusting devices each comprise a drive body, which comprise a control element, located in engagement with the coupling element and extending in a spiral shape around the rotational axis of the drive body.

According to this embodiment of the invention, the container guiding device comprises two adjusting devices, which are each connected to a guide element of the railing, such that both guide elements of the railing can be adjusted relative to one another. This embodiment of the invention therefore allows for a particularly exact and convenient setting of the railing width, wherein, due to the use of two adjusting devices, in particular, particularly narrow and wide railing widths can be adjusted.

The drive of the drive bodies can in principle be provided in any desired manner, for example even by a manual adjustment of the drive bodies, carried out by operating personnel. According to a particularly advantageous embodiment of the invention, however, provision is made for the advantageously provided drive shaft to be driven by a motor. The use of a motor-driven drive shaft allows for the positioning of at least one guide element in relation to the other guide element to be carried out particularly exactly, such that a precise adjustment of the railing width can be carried out. Moreover, by the use of a motor-driven drive shaft, by a self-restricting of the motor drive, a particularly reliable securing of the position of the adjusted guide element can be achieved, such that supplementary position securing measures can be avoided.

According to a further embodiment of the invention, provision is made for the container guide device to comprise several adjusting devices arranged adjacent to one another in the transport direction, which are connected to one another by means of a common drive shaft. According to this embodiment of the invention, the container guiding device comprises several adjusting devices, arranged at a spacing interval from one another in the transport direction, which in each case are connected to a section of the guide element. The use of several adjusting devices makes it possible for a stable railing to be provided over particularly long stretches, of which the railing width can be adjusted by the adjusting device.

The adjustment by means of a common drive shaft ensures in a particularly reliable manner a concordant adjustment of the drive body, and therefore of the coupling elements connected to the guide element, such that any divergent positionings of the guide element observed in the transport direction can be effectively excluded. In the case of a transport direction extending along a curve, the drive shaft can in this situation be connected by cardan shafts arranged between the adjusting devices, such that curve sections of the container transport device can be provided with a corresponding railing.

The run course of the container guiding device is aligned in accordance with the arrangement in relation to one another of the processing stations assigned to the containers, which are connected to one another by means of the container guiding device. According to one advantageous further embodiment of the invention, the guide elements exhibit a curved course at least in some sections in the transport direction, wherein provision is made for
  an adjusting device with a coupling element, connected in a fixed position in the transport direction to the guide elements, and
  at least one further adjusting device, with a coupling element connected adjustably in the transport direction to the same guide element.

According to this embodiment of the invention, in order to adjust the railing width in a curved section, the container guiding device comprises at least two adjusting devices arranged behind one another in the transport direction, but of which only one comprises, in the transport direction of the containers, a fixed position connection of the coupling element to the guide element.

In addition to this adjusting device, connected in a fixed position to the guide element, the container guiding device further comprises, in the curve-shaped section, at least one further adjusting device, wherein the coupling element is adjustable in the transport direction, in particular connected in a sliding manner to the guide element. The adjustable connection of the coupling elements of this second adjusting device, and/or of each further adjusting device, to the guide elements in the region of the curved sections, allows for special measures to be done without, aimed at length compensation due to a change in the curve length of the curve-shaped section when an adjustment of the guide elements takes place.

For the fixed-position securing of the coupling elements to the guide elements, use can be made, for example, of clamping jaws. An adjustable connection in the transport direction of the coupling elements to the guide elements can be put into effect by means of suitable sliding bodies, which are connected in an appropriate manner to the guide elements, such as to allow for a sliding displacement in the transport direction.

In order to form the railings, according to a further embodiment of the invention, the guide elements are configured for the detachable receiving of railing elements. The use of railing elements which can be arranged at the guide elements makes it possible for the railing elements to be selected in accordance with the containers which are to be conveyed, and to be exchanged if the need arises. It is also possible for damaged railing elements to be replaced particularly easily in the event of faults, wherein these are then separated from the guide elements and replaced by new or repaired railing elements.

Particularly advantageously, provision is made in this situation for the railing elements to be configured so as to be telescopic in the transport direction. The use of telescopic railing elements is particularly well-suited for arrangement in the region of a curve-shaped course of the container guiding devices, wherein length changes of the curved section due to an adjustment of the guide elements can be reliably compensated by the telescoping capability of the railing elements, such that a continuous guiding arrangement is formed for the containers which are to be transported.

The method according to the invention for setting the spacing interval between the guide elements comprises the following steps:

Rotation of the drive body in order to displace at least one guide element of the railing in relation to its other guide element, transversely to the transport direction, and ending of the rotation after reaching the spacing interval which is to be set, in order to secure the guide elements in relation to one another.

The method according to the invention makes it possible, with the use of the container guiding device presented heretofore, by a simple rotation of the drive body, for the railing width to be set, and then secured in the position to be set, after reaching the intended railing width setting, by ending the rotation.

BRIEF DESCRIPTION OF THE FIGURES

Exemplary embodiments of the invention are explained hereinafter by reference to the drawings. The Figures show:

FIG. 2b a further perspective view of the container guiding device from FIG. 2a;

DETAILED DESCRIPTION OF THE INVENTION

Figure 1:
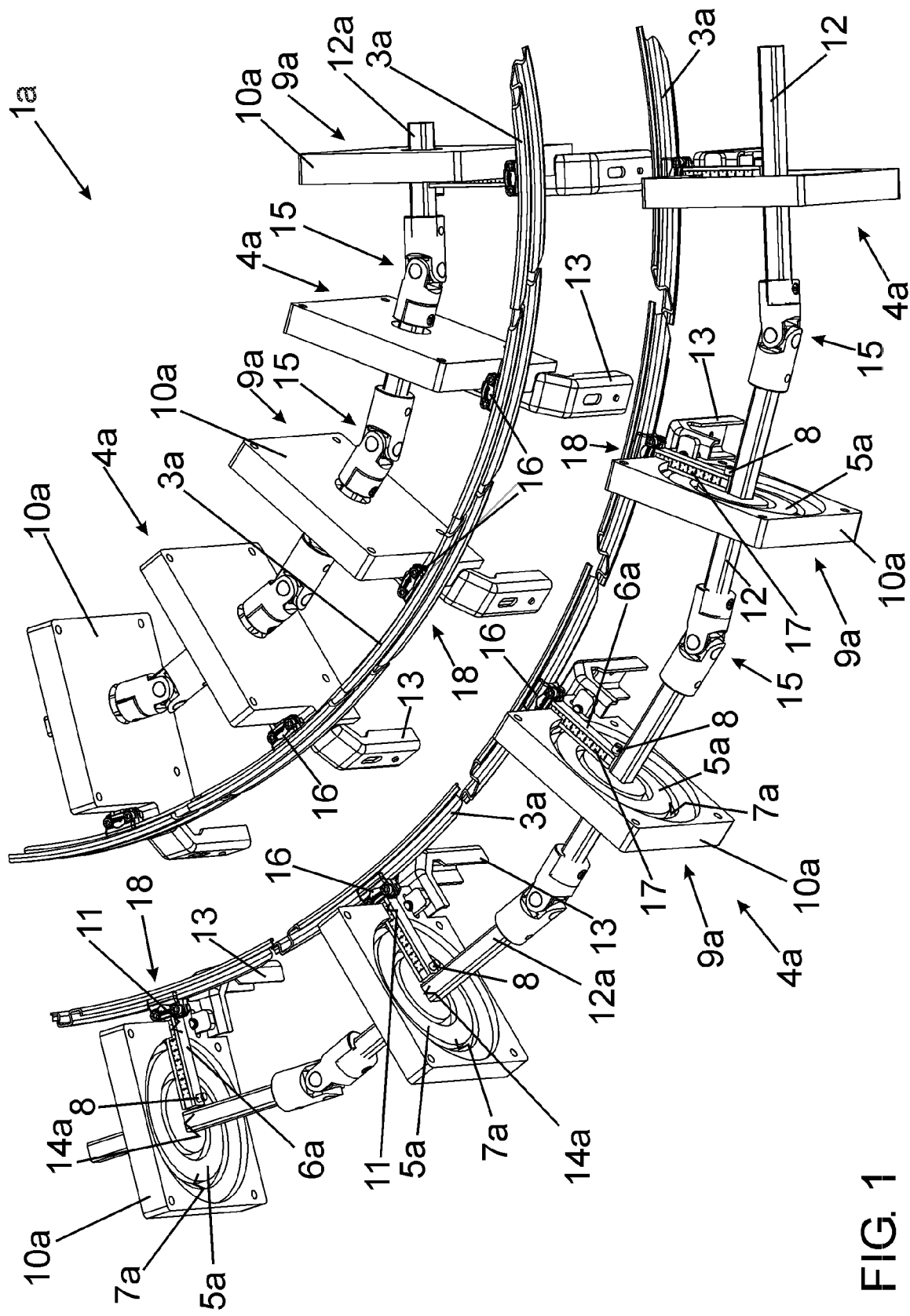
FIG. 1 In a perspective view, a part region of a first exemplary embodiment of a container guiding device.

FIG. 1 shows, in a perspective view, a first embodiment of a section of a container guiding device 1a, which is suitable for arranging on a container transport device, not represented here, which transports, for example by means of a transport belt, containers, such as bottles or packages of bottles, along a container handling system, likewise not represented here.

The container guiding device 1a comprises curve-shaped guide elements 3a, arranged at a spacing interval from one another, which are configured so as to receive a curve-shaped railing 2. The railing width in this situation depends on the spacing interval of the opposing guide elements 3a. In order to adjust the spacing interval of the guide elements 3a, in this situation the container guide device 1a comprises several adjusting devices 4a, which are arranged adjacent to one another along the transport direction, and can be displaced by means of their mutually opposing guide elements 3a transversely to the transport direction.

In order to adjust the position of the guide elements 3a, the adjusting devices 4a comprise in each case a drive body 5a, arranged rotatably inside a housing half 10a of a housing 9a, which comprises control element, extending in a spiral shape around the rotational axis, which is configured as a control groove 7a. The control groove 7a serves to receive a control bolt 8, extending parallel to the rotational axis through a coupling element 6a, which can be displaced inside the spiral-shaped control groove 7a. The coupling element 6a extends in turn through a guide opening 11 of the housing half 10a, and is connected by its end facing away from the control bolt 8, by means of a connecting element 18, to a section of the guide element 3a.

A rotation of the drive body 5a inside the housing half 10a therefore causes, as a function of the rotational direction, an axial displacement of the coupling element 6a inside the guide opening 11, wherein, as a dependency of the rotational direction of the drive body 5a, the guide element 3a is adjusted, in the direction of the opposing guide element 3a or in the opposite direction to this. By analogy, an adjustment of the opposing guide element 3a of a railing 2 takes place, such that, by an actuation of the adjusting devices 4a of the opposing guide elements 3a, an adjustment of the width of the railing 2 can be put into effect.

For the rotation of the drive bodies 5a of the adjacently arranged adjusting devices 4a, a drive shaft 12a extends through shaft receivers 14a of the drive bodies 5a of the adjusting devices 4a, arranged adjacent to one another. Cardan shafts 15, arranged between the adjusting devices 4a, in this situation ensure a transfer of the rotational movements of the individual segments of the drive shaft 12a, running at an angle to one another.

For the defined setting of the railing width, the coupling elements 6a comprise a scale 17, which allows the operating personnel to carry out a predetermined setting of the guide elements 3a, which are secured between clamping jaws 16 of the connecting element 18, in an exact manner in relation to the housing 9a.

For arranging the container guiding device 1a, or the individual adjusting devices 4a of the container guiding device 1a, the adjusting devices 4a comprise in each case a holding element, formed as a carrier 13, which makes it possible for the adjusting devices 4a to be positioned at a desired position on the container transport device.

Figure 2A:
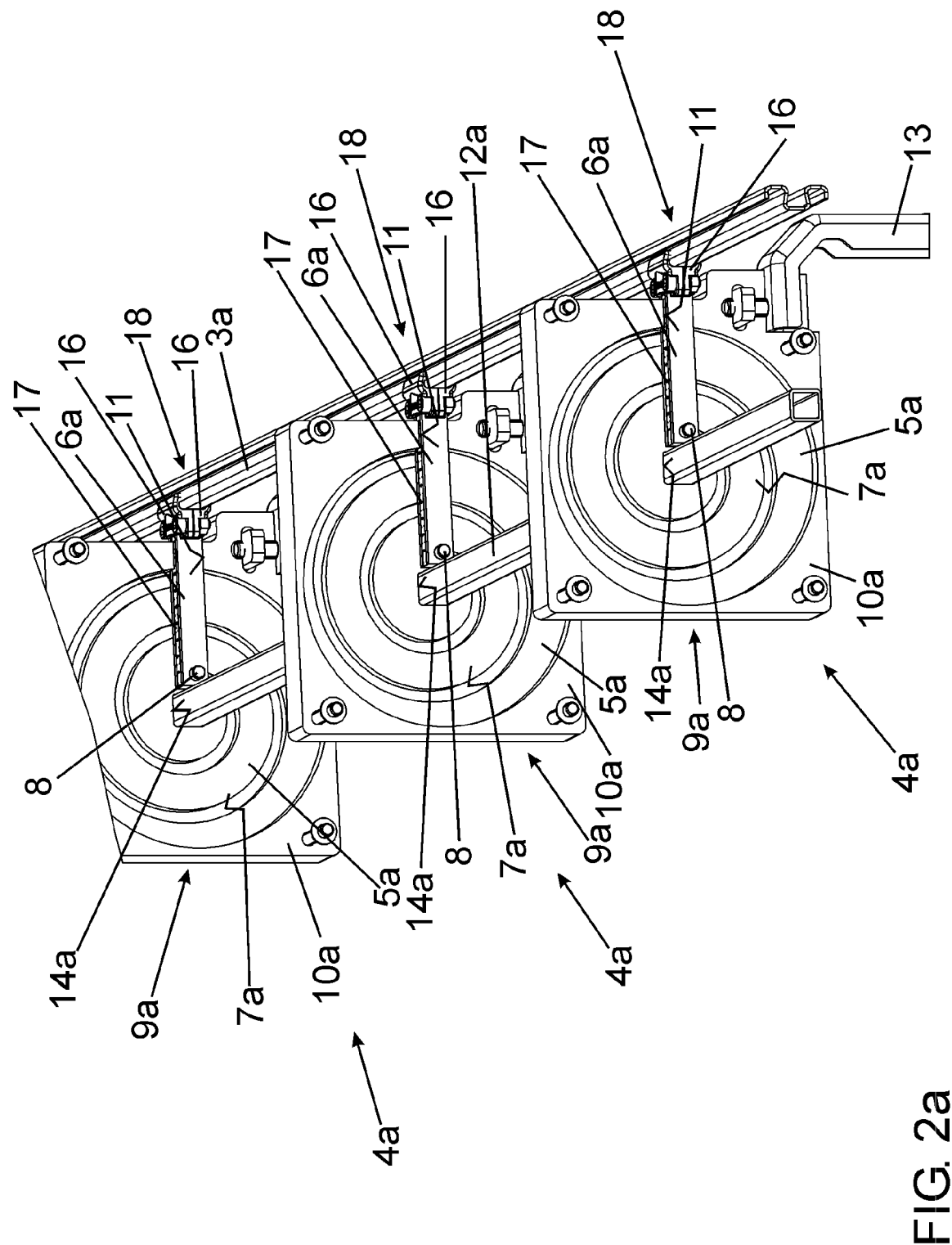
FIG. 2a In a perspective view, a part region of a second exemplary embodiment of a container guiding device.
Figure 2B:
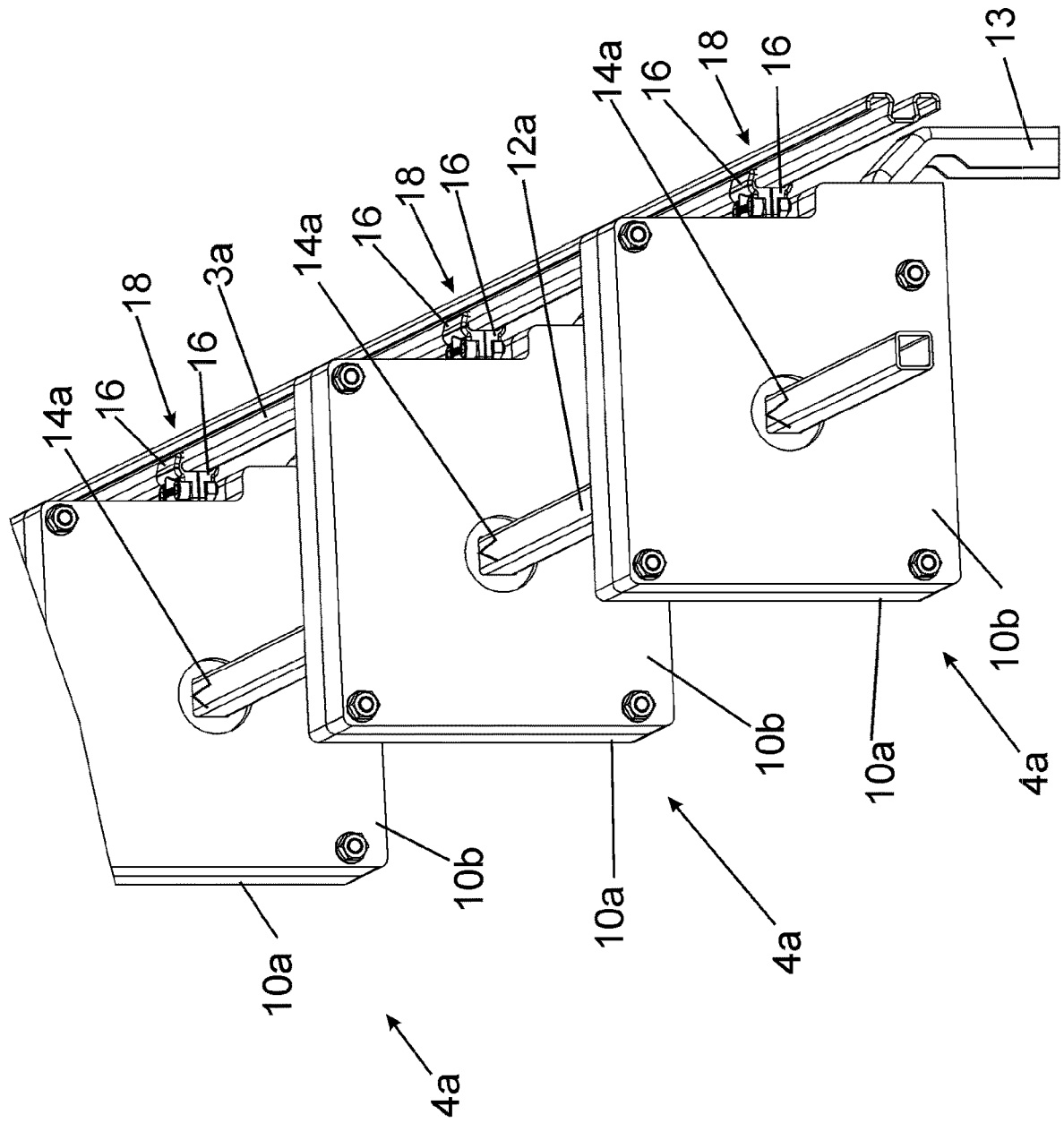

Represented in FIGS. 2a and 2b is a part region of a container transport unit, wherein, as a departure from the exemplary embodiment represented in FIG. 1, the guide element 3a exhibits a straight line course. The housings 9a are represented in the opened state, such that a half of the drive body 5a, with the spiral-shaped control groove 7a, can be identified. In the completed state of the entire drive body 5a, it is formed from two opposing disk-shaped halves, between which the coupling element 6a is arranged. As a departure from the exemplary embodiment represented in FIG. 1, the drive shaft 12a comprises a single-piece configuration, and extends, in the manner represented heretofore, through the shaft receivers 14a of the drive bodies 5a of the individual adjusting devices 4a, wherein a configuration of the drive shaft 12a as quadratic in cross-section ensures a reliable transfer of the rotational movement of the drive shaft 12a onto the drive bodies 5a.

Represented in FIG. 2b are the adjusting devices 4a, represented in FIG. 2a, with a closed housing 9a, wherein the housing 9a of the adjusting device 4a is formed from a first housing half 10a and a second housing half 10b. The second housing half 10b comprises in this situation, analogously to the housing half 10a, a drive body 5a, which corresponds to the drive body 5a in the housing half 10a. The control bolt 8 of the coupling element 6a is therefore, in the closed state of the housing 9a, guided in the control grooves 7a of the two drive bodies 5a arranged in the housing 9a.

Figure 3A:
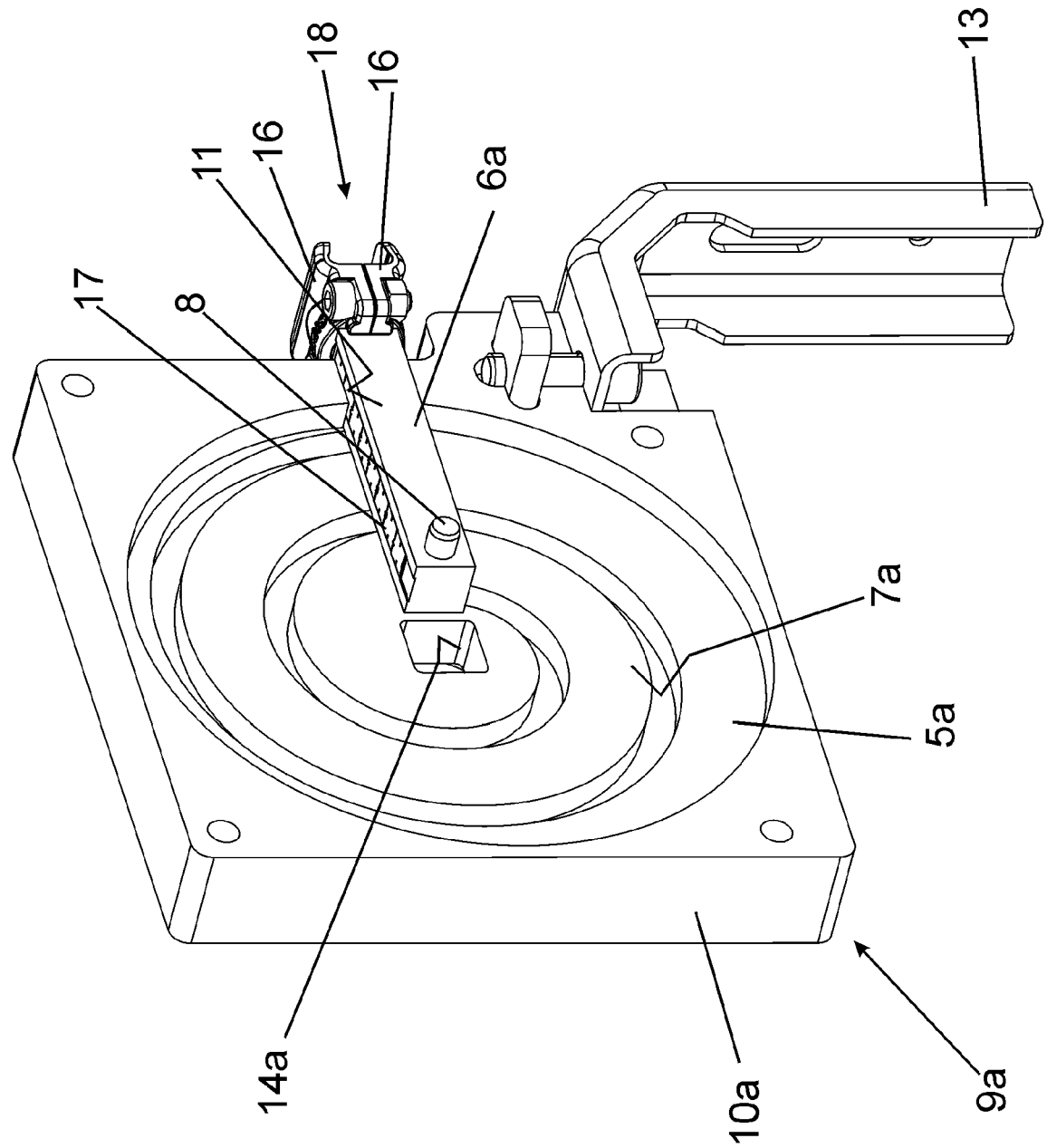
FIG. 3a a perspective view of an adjusting device of the container guiding device from FIG. 1 in a first end position.
Figure 3B:
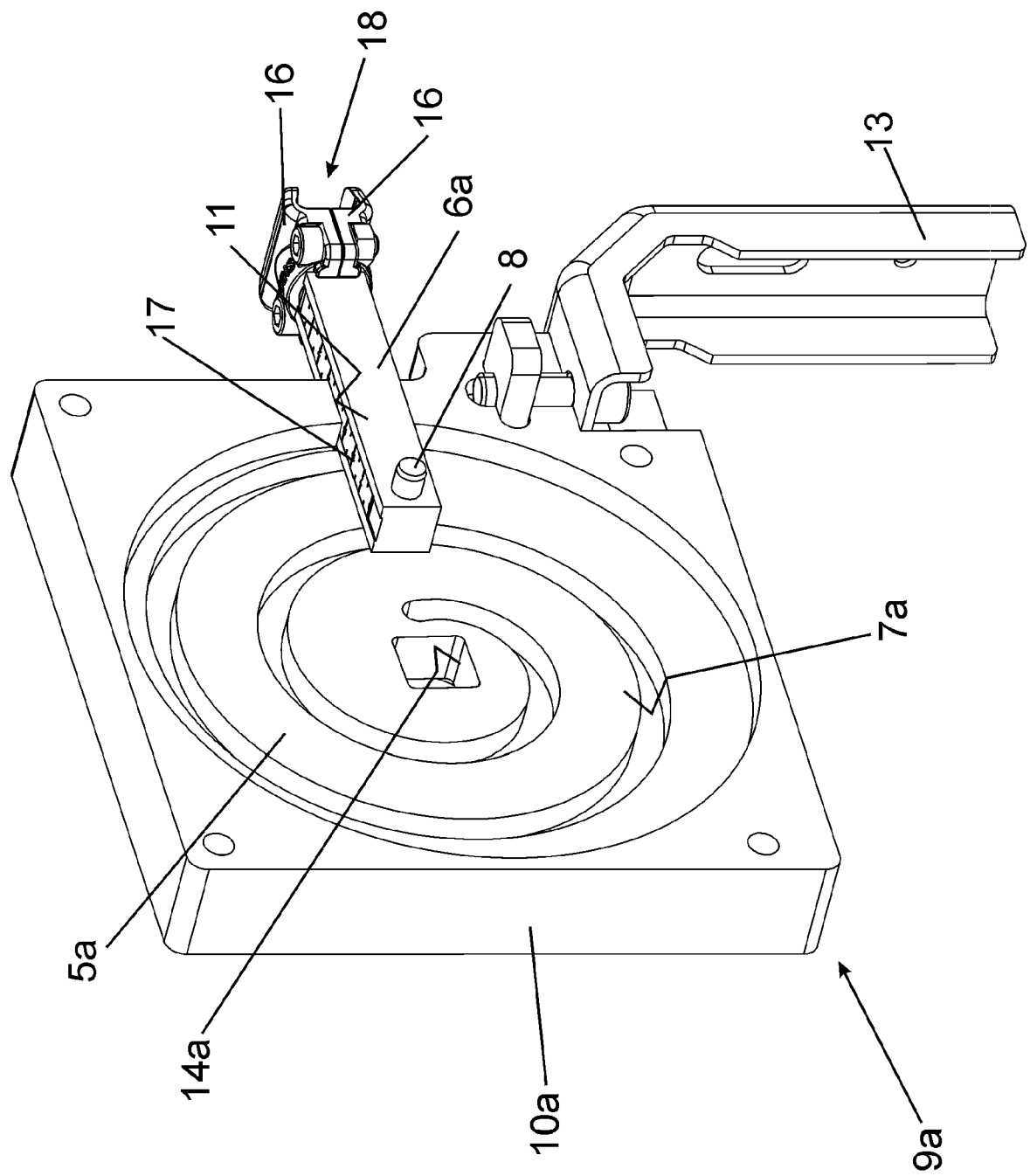
FIG. 3b a perspective view of the adjusting device from FIG. 3a in an intermediate position, and FIG. 3c a further perspective view of the adjusting device from FIG. 3a, in a second end position.
Figure 3C:
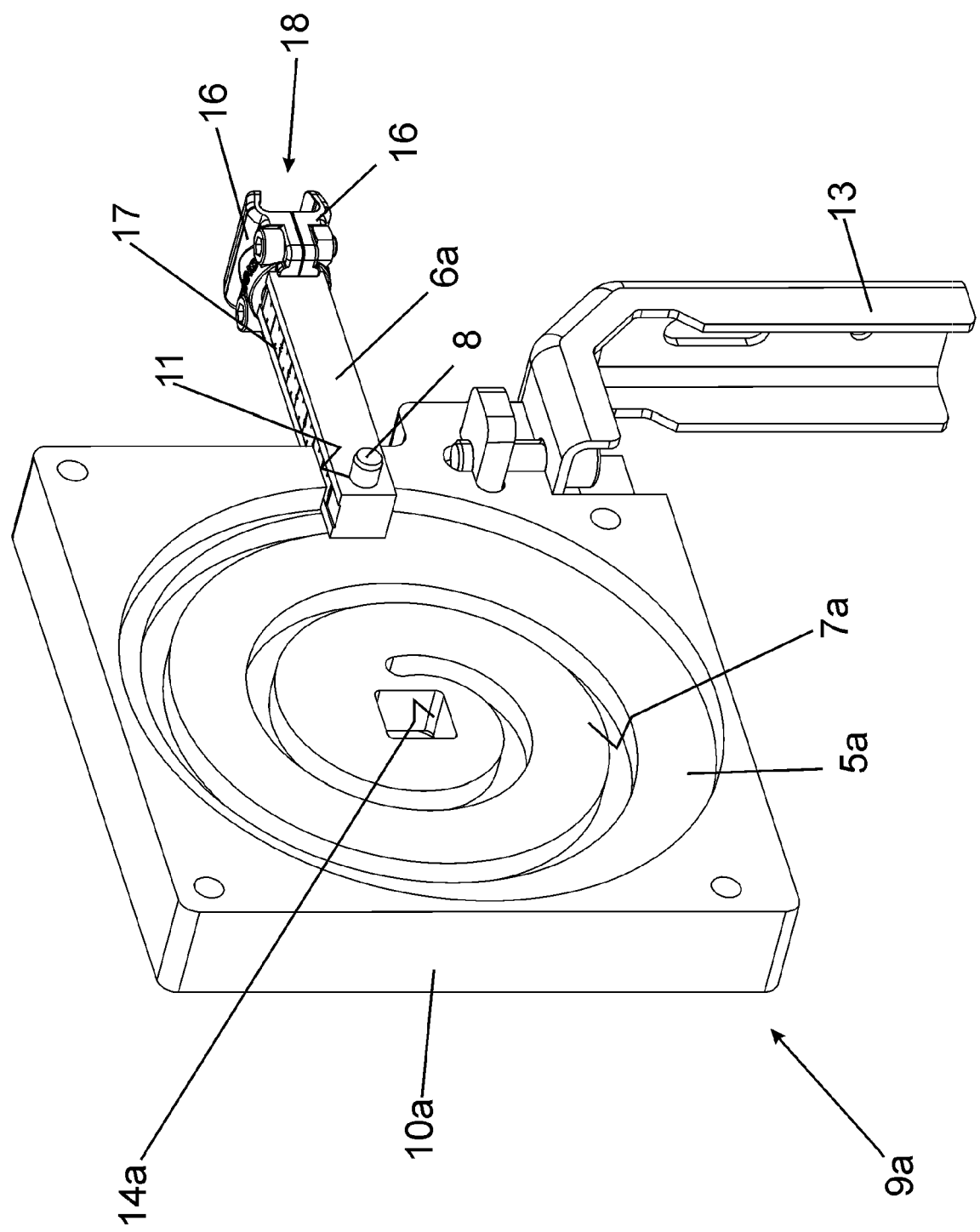

The function mode of the adjusting devices 4a is represented in supplementary form in FIGS. 3a to 3c, wherein, in FIG. 3a, the coupling element 6a is arranged in a first end position, in FIG. 3b the coupling element 6a is arranged in an intermediate position, and in FIG. 3c the coupling element 6a is arranged in a second end position in relation to the adjusting device 4a. In the first end position, the control bolt 8 is in the position nearest to the rotational axis, inside the control groove 7a. In the intermediate position represented in FIG. 3b, the control bolt 8 is located in a region of the control groove 7a between the first end position and the second end position. In FIG. 3c, the control bolt 8 is located in the point of the control groove 7a which is furthest away from the rotational axis.

Possible forces taking effect on the coupling element 6a in its longitudinal direction, as a consequence of a loading incurred by packages or containers being guided, will not lead to any incorrect movement of the guide elements 3a connected to the coupling element 6a, due to their perpendicular alignment in relation to the control groove 7a, such that a self-limiting effect pertains of the position which has been set of the guide elements 3a, by way of the drive bodies 5a.

Figure 4A:
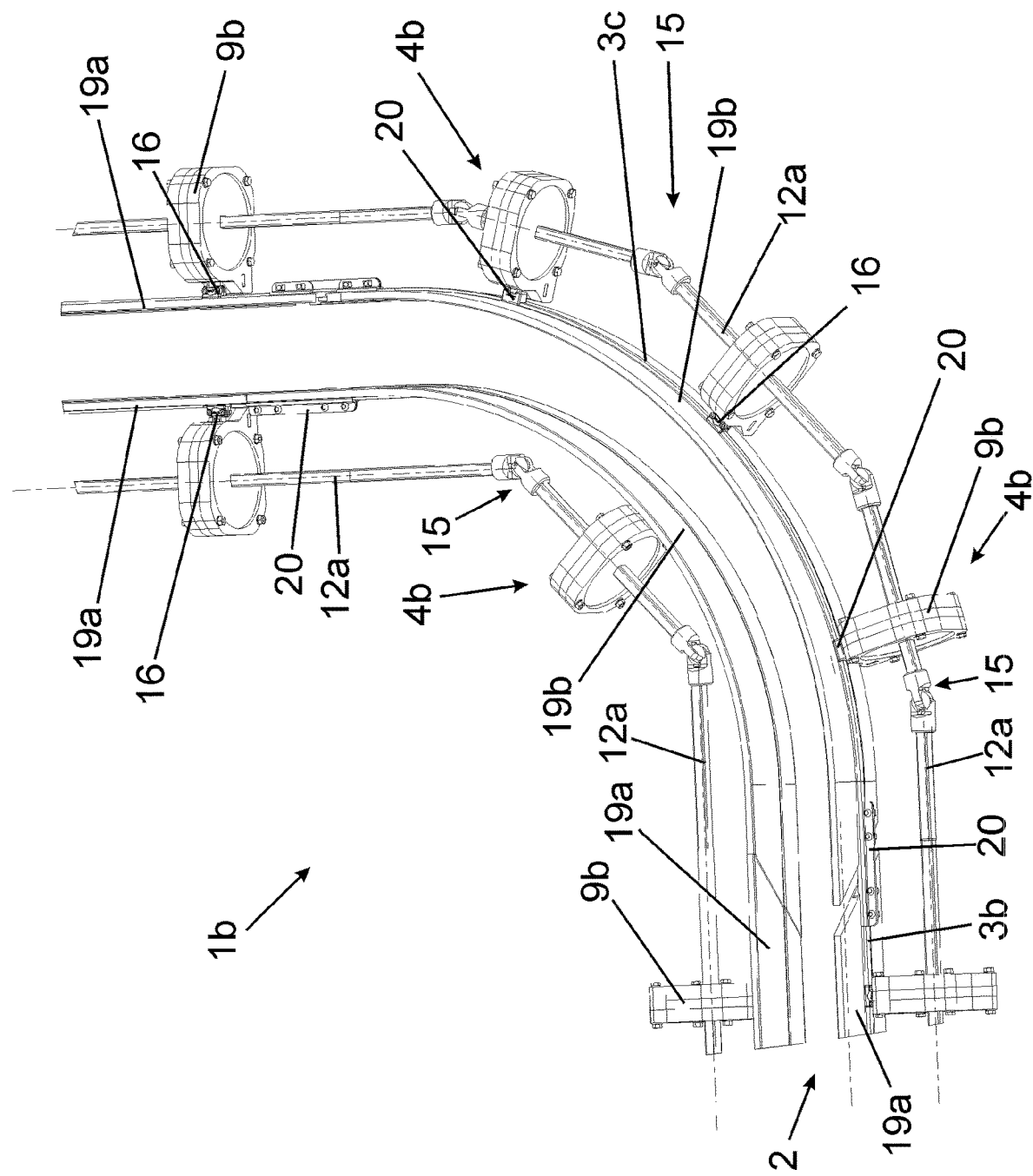
FIG. 4a a perspective view of a third embodiment of the adjusting device, in a first railing position.
Figure 4B:
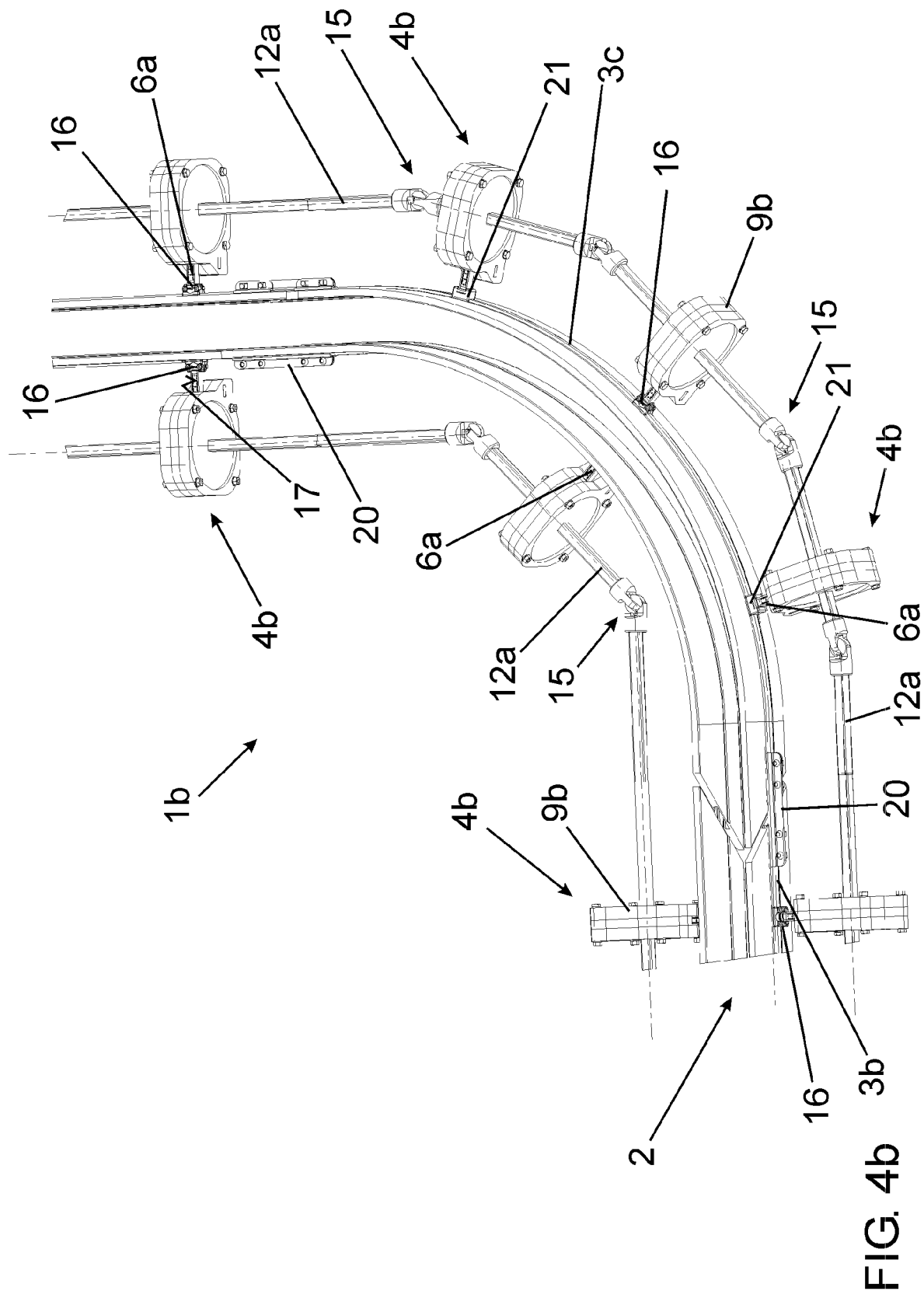
FIG. 4b a perspective view of the adjusting device from FIG. 4a, in a second railing position.
Figure 4C:
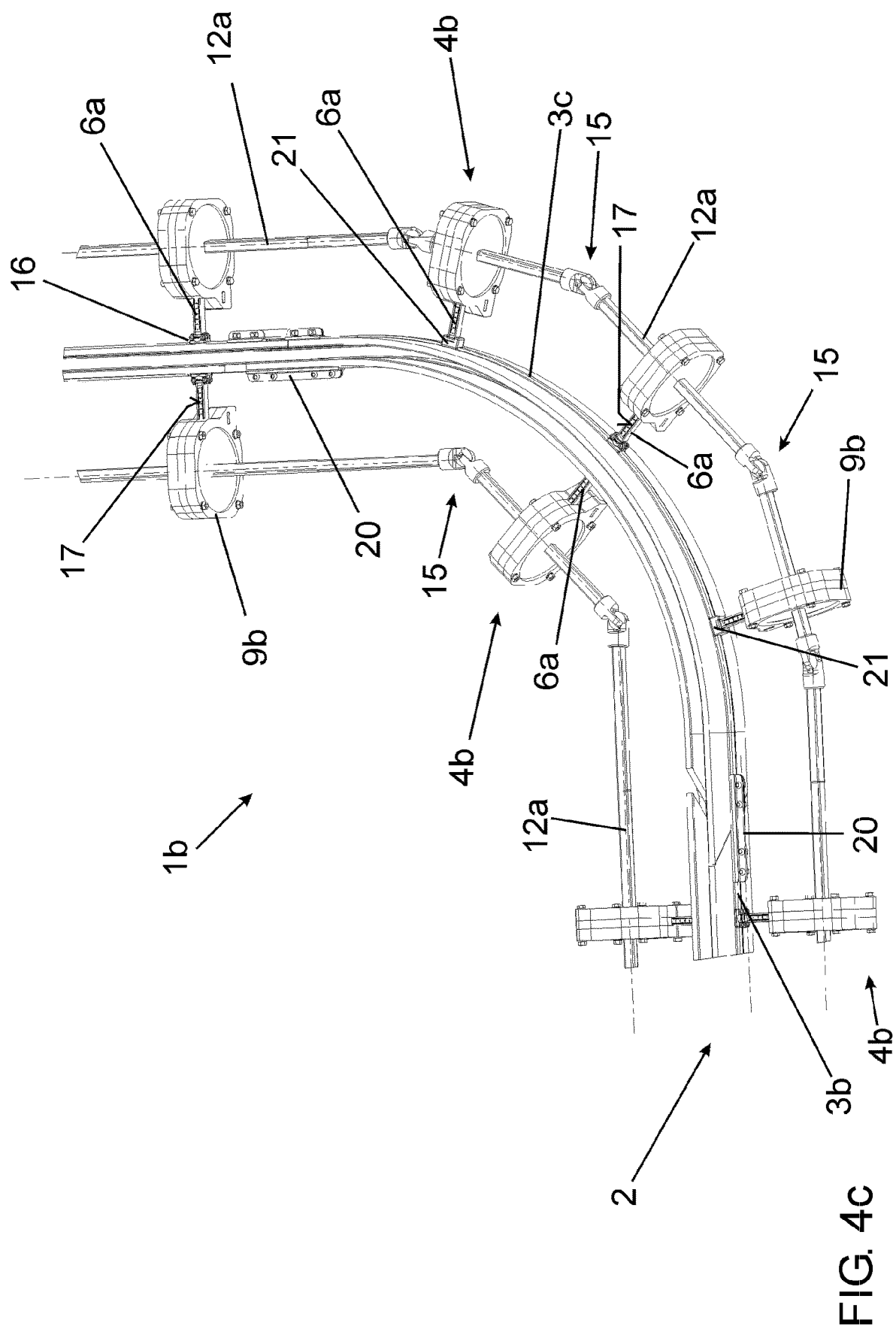
FIG. 4c a perspective view of the adjusting device from FIG. 4a, in a third railing position.

Represented in FIGS. 4a to 4c is a third embodiment of a container guiding device 1b in different positions of the railing elements 19a, 19b, determining the railing width, detachably arranged at the guide elements 3b, 3c.

In a curved region of the container guiding device 1b, three adjusting devices 4b are connected to the guide element 3c, on the outside of the container guiding device 1b. In this situation, it is the middle adjusting device 4b alone, in the middle section of the curved run course in the transport direction, which is connected to the guide element 3c in a fixed position by means of clamping jaws 16 forming a connecting element. Conversely, the adjusting devices 4b connected to the guide element 3c, adjacent to this adjusting device 4b in the curved section, are coupled by means of connecting elements 20 to the guide element 3c, which can be displaced in a sliding manner in the transport direction along the guide element 3c.

On both sides in the transport direction, adjacent to the curved section of the container guide device 1b, the curved guide elements 3c are connected by connection elements 20 to the guide elements 3b, extending in a straight line, which allow for a compensation of length.

By means of a rotation of the drive bodies 5a arranged in the housing 9b, a displacement takes place of the railing elements 19a, 19b connected to the guide elements 3b, 3c, between the position represented in FIG. 4a, in which the container guiding device 1b exhibits the greatest spacing interval between the railing elements 19a, 19b, and the position of the railing elements 19a, 19b, represented in FIG. 4c, in which these exhibit the smallest spacing interval from one another. Represented in FIG. 4b is an intermediate position between the end positions represented in FIGS. 4a and 4c.

Figure 5:
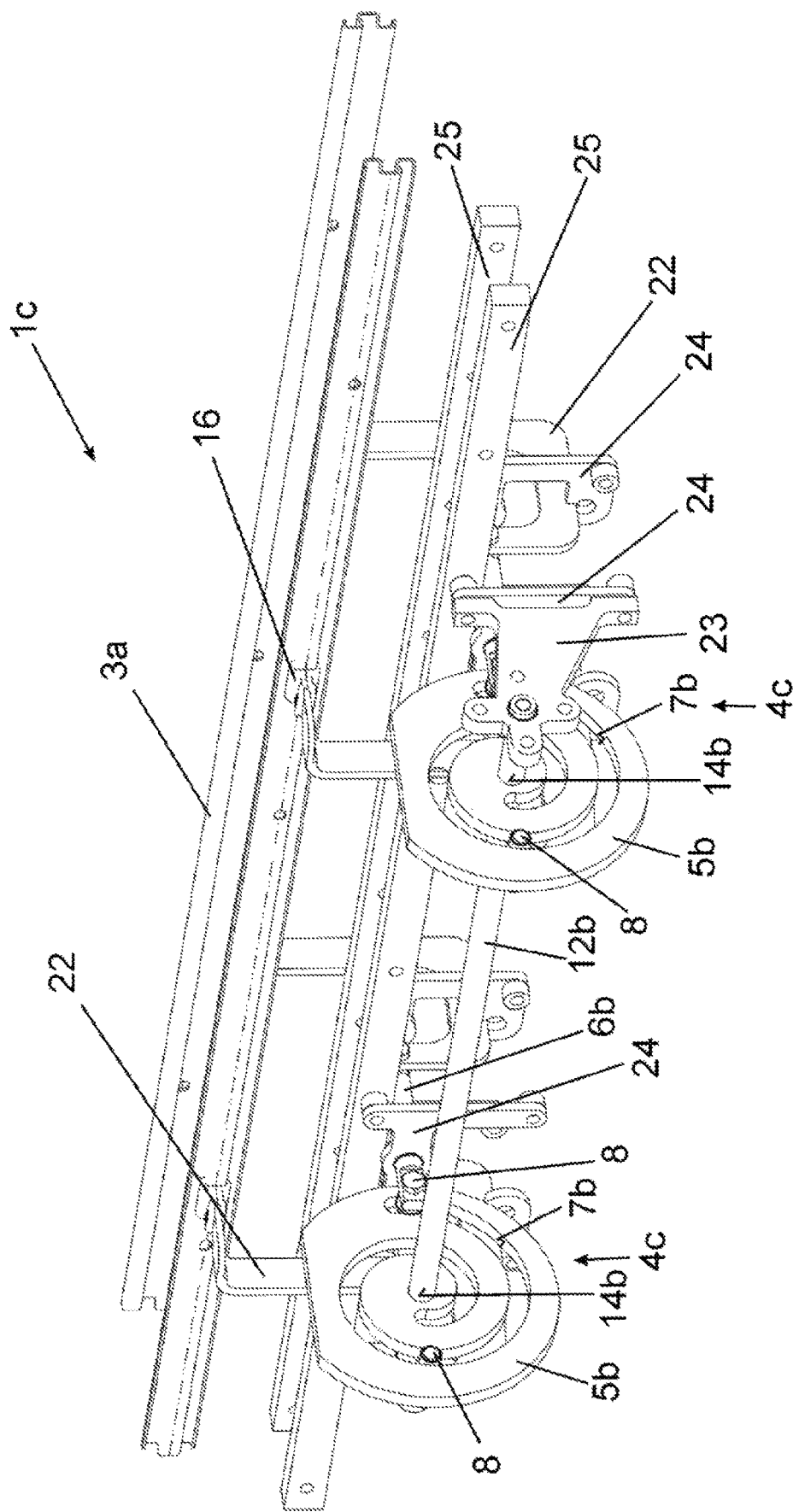
FIG. 5 a perspective view of a fourth embodiment of the adjusting device.
Figure 6:
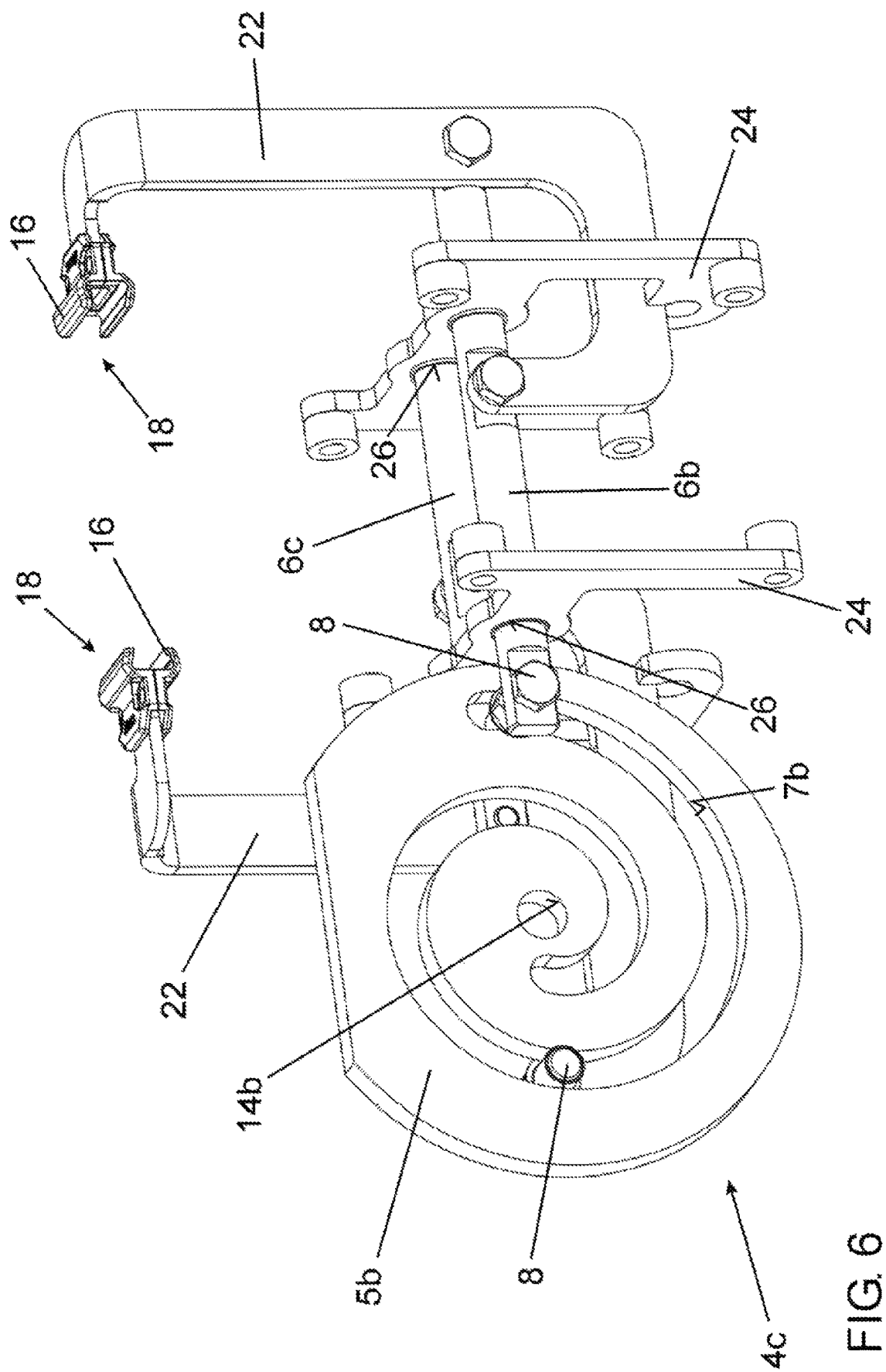
FIG. 6 a further perspective view of the adjusting device from FIG. 5.

Represented in a perspective representation in FIG. 5 is a further embodiment of a section of a container guiding device 1c. With this embodiment of the container guiding device 1c, one single drive body 5b of an adjusting device 4c serves to adjust the spacing interval of the two guide elements 3a. For this purpose the adjusting device 4c comprises, seen in the transport direction, two coupling elements 6b, 6c, on opposing sides, in working connection with the control groove 7b by means of control bolts 8, wherein the two control bolts 8 are arranged, seen in the transport direction, diametrically opposite the drive body 5b, in engagement with the control groove 7b. The control bolt 8, arranged at the drive body 5b facing towards the guide elements 3a, is connected to a coupling element 6b, which extends in a longitudinally displaceable manner through guide openings 26 at two holding elements 24, which are connected, at a spacing interval from one another, in each case to a base rail 25. The control bolt 8, arranged at the greatest spacing interval from the guide elements 3a, is connected to the coupling element 6c, which likewise extends in a longitudinally displaceable manner through guide openings 26 at the holding elements 24.

A rotation of the drive bodies 5b by means of a drive shaft 12b, extending through shaft receivers 14b, which is arranged in a rotatable manner on carrier elements 23, connected to the holding elements 24, causes a longitudinal displacement of the coupling elements 6b, 6c, wherein, as a dependency of the rotational direction of the drive body 5b, the connecting elements 18 are moved towards one another or apart from one another, wherein the connecting elements 18 are connected in each case by means of a link 22 to the coupling elements 6b, 6c.

REFERENCE NUMBER LIST 1a, 1b, 1c Container guiding device
2 Railing 3a, 3b, 3c Guide element
4a, 4b, 4c Adjusting device
5a, 5b Drive body
6a, 6b, 6c Coupling element
7a, 7b Control element/control groove
8 Control bolt
9a, 9b Housing
10a, 10b Housing half
11 Guide opening
12a, 12b Drive shaft
13 Holding element/carrier
14a, 14b Shaft receiver
15 Cardan shaft
16 Clamping jaw
17 Scale
18 Connecting element
19a, 19b Railing element
20 Connecting element
21 Guide body
22 Link
23 Carrying element
24 Holding element
25 Base rail
26 Guide openings

The invention claimed is:

1. A container guiding device, comprising:
a railing having two guide elements for guiding containers or packages, said guide elements being arranged at a spacing distance from one another and extending in a transport direction of a container transport device;
at least one of said guide elements being transversely adjustable relative to an oppositely disposed said guide element;
an adjusting device for transversely adjusting said at least one guiding element, said adjusting device having a drive body, which is rotatable about a rotational axis, and a coupling element connected to said at least one guiding element and to said drive body in such a way that a rotation of said drive body causes a displacement of said coupling element transversely to the transport direction;
said drive body being a one-part or multi-part drive body with a control element in engagement with said coupling element, said control element having a spiral-shaped course, at least in sections, about the rotational axis of said drive body, with the spiral-shaped course extending in a plane perpendicular to the rotational axis.

2. The container guiding device according to claim 1, wherein said control element is a control groove configured to displaceably receive a control bolt connected to said coupling element.

3. The container guiding device according to claim 1, wherein said drive body is rotatably arranged in a housing of said adjusting device, said housing being formed with a guide opening securing said coupling element in a circumferential direction of said drive body.

4. The container guiding device according to claim 1, wherein said adjusting device comprises two drive bodies, with corresponding control grooves opposing one another in a direction of the rotational axis, and wherein each of said control grooves is configured to receive a control bolt connected to said coupling element.

5. The container guiding device according to claim 1, further comprising a drive shaft extending in a direction of the rotational axis, said drive body being non-rotatably connected to said drive shaft.

6. The container guiding device according to claim 1, wherein said coupling element is in engagement with said drive body on a side facing away from said guide element in relation to the rotational axis.

7. The container guiding device according to claim 1, wherein said adjusting device comprises two coupling elements in engagement with said drive body and an adjustment of said drive body causes an opposite adjustment of said coupling elements.

8. The container guiding device according to claim 7, wherein each of said two coupling elements is connected by a respective link that is connected to a respective one of said guide elements that are arranged opposite one another.

9. The container guiding device according to claim 1, wherein each of said two guide elements of said railing is displaceable by a respective adjusting device transversely to the transport direction, wherein each of said adjusting devices comprises a drive body with a control element extending in spiral form around the rotational axis of said drive body and in engagement with said coupling element.

10. The container guiding device according to claim 1, further comprising a drive shaft and a motor driving said drive shaft.

11. The container guiding device according to claim 1, wherein said adjusting device is one of a plurality of adjusting devices arranged adjacent one another and connected to one another by a common drive shaft.

12. The container guiding device according to claim 1, wherein said guide elements define a run course which is curved, at least in sections, along the transport direction, and wherein:
a first adjusting device includes a coupling element, which is rigidly affixed in the transport direction to one of said guide elements; and
at least one further adjusting device includes a coupling element, which is adjustably connected in the transport direction to said one guide element.

13. The container guiding device according to claim 1, wherein said guide elements are configured for detachably receiving respective railing elements of said railing.

14. The container transport device for transporting containers along a transport direction, said container transport device comprising at least one container guiding device according to claim 1.

15. A method for setting a spacing interval of guide elements of a railing, the method comprising:
providing a container guiding device according to claim 1;
rotating the drive body in order to displace at least one guide element of the railing relative to an oppositely disposed guide element, transversely to the transport direction; and
upon reaching the spacing interval to be set, ending a rotation of the drive body to secure the guide elements relative to one another.

16. A container guiding device, comprising:
a railing having two guide elements for guiding containers or packages, said guide elements being arranged at a spacing distance from one another and extending in a transport direction of a container transport device;
said guide elements being transversely adjustable relative to one another in an oppositely disposed position thereof;
an adjusting device for transversely adjusting said guide elements, said adjusting device having two drive bodies, which are rotatable about a rotational axis, and coupling elements respectively connected to said guide elements and to said drive bodies in such a way that a rotation of said drive bodies causes a displacement of said coupling elements transversely to the transport direction;

each of said drive bodies being a one-part or multi-part drive body with a control element in engagement with a respective said coupling element, said control element having a spiral-shaped course, at least in sections, about the rotational axis of said drive body, and each of said control grooves being configured to receive a control bolt connected to the respective said coupling element.

17. A container guiding device, comprising:

a railing having two guide elements for guiding containers or packages, said guide elements being arranged at a spacing distance from one another and extending in a transport direction of a container transport device;

at least one of said guide elements being transversely adjustable relative to an oppositely disposed said guide element;

an adjusting device for transversely adjusting said at least one guide element, said adjusting device having a drive body, which is rotatable about a rotational axis, and a coupling element connected to said at least one guide element and to said drive body in such a way that a rotation of said drive body causes a displacement of said coupling element transversely to the transport direction;

said drive body being a one-part or multi-part drive body with a control element in engagement with said coupling element, said control element having a spiral-shaped course, at least in sections, about the rotational axis of said drive body; and wherein said adjusting device comprises two coupling elements in engagement with said drive body and an adjustment of said drive body causes an opposite adjustment of said coupling elements, and wherein each of said two coupling elements is connected by a respective link that is connected to a respective one of said guide elements that are arranged opposite one another.

* * * * *